United States Patent [19]

Mikina

[11] Patent Number: 4,603,763

[45] Date of Patent: Aug. 5, 1986

[54] DRUM BRAKE WITH NEGATIVE FEEDBACK FOR BRAKE SHOE FRICTION COMPENSATION

[76] Inventor: Stanley J. Mikina, Rte. 2 Berna-Knoll 21, Hendersonville, N.C. 28739

[21] Appl. No.: 654,223

[22] Filed: Sep. 25, 1984

[51] Int. Cl.$^4$ .............................................. F16D 51/24
[52] U.S. Cl. .................................. 188/334; 188/250 F
[58] Field of Search ............... 188/106 F, 106 A, 327, 188/334, 335, 340, 341, 342, 343, 364, 217, 250 F

[56] References Cited

U.S. PATENT DOCUMENTS

| | | | |
|---|---|---|---|
| 1,787,494 | 1/1931 | Sanford | 188/250 F |
| 2,111,755 | 3/1938 | Compton | 188/334 X |
| 2,218,201 | 10/1940 | Lapwood | 188/334 X |
| 2,453,808 | 11/1948 | Myklestad | 188/327 X |

FOREIGN PATENT DOCUMENTS 537248  4/1955  Belgium .......................... 188/106 A Primary Examiner—Bruce H. Stoner, Jr.
Assistant Examiner—Richard R. Diefendorf
Attorney, Agent, or Firm—William J. Ruano

[57] ABSTRACT

This invention relates to a drum brake with two internal expanding brake shoes pivoted at substantially diametrically opposite axes. It incorporates the negative feedback of the brake shoe sliding friction forces to oppose the applied hydraulic brake actuating forces for the purpose of reducing variation in brake torque due to random or uncontrolled variations in the coefficient of friction between brake shoes and brake drum. The required brake shoe friction force feedback is accomplished by eliminating the normally leading brake shoe with its undesirable lock-up prone positive feedback and replacing it with a brake shoe pivoted about an axis diametrically opposite the pivot axis of the normally trailing brake shoe. The location of the shoe pivots is chosen to establish the required feedback magnitude by use of lever ratios whose adequacy is verified by the force equilibrium equations of the brake system. The resulting unconventional location of the brake shoe pivots permits the sliding friction forces between shoes and drum at both shoes to be applied as forces acting in a direction opposite the applied brake actuating hydraulic forces for forward vehicle motion. This preferred location of the brake shoe pivots also results in uniform wear of the brake shoe lining without the necessity for starwheel turnbuckle wear compensation as in conventional drum brakes. Devices are also provided for preventing brake lock-up during reverse operation due to the positive feedback of friction forces at both brake shoes for that direction of motion.

1 Claim, 3 Drawing Figures

DRUM BRAKE WITH NEGATIVE FEEDBACK FOR BRAKE SHOE FRICTION COMPENSATION

BACKGROUND OF THE INVENTION

This invention relates to drum brakes, in general, but in particular to drum brakes for vehicles. It is an object of the invention to solve the problem of prevention of car skidding caused by excessive brake torques at the rear wheels in relation to the brake torques at the front wheels. A further object of the invention is to maintain an adequate and effective brake torque even with unfavorable conditions of brake shoe friction.

In order to insure that braking torques on front and rear wheels are properly proportioned to avoid unsymmetrical wheel locking and car skidding, means, such as a proportioning valve, are used to distribute the hydraulic brake actuating force at the front and rear wheels so as to maintain a fixed ratio of rear to front brake torques. However, such means are made less effective if the coefficient of sliding friction between the brake shoes and the brake drum varies in a random and unpredictable manner due to such factors as corrosion, wear, abrasive dust, moisture, and other chemical and physical changes. An additional important factor that works against the desired brake torque proportioning is the presence of the leading brake shoe with positive feedback in the existing conventional drum brakes. This positive force feedback magnifies the brake torque changes due to changes in the sliding coefficient of friction. This is especially serious when a comparatively small increase in the sliding coefficient results in a comparatively large increase in the brake torque in a steeply non-linear exponential or hyperbolic manner.

SUMMARY OF THIS INVENTION

In this conception, the effect of such variations in brake friction coefficient is greatly reduced by utilizing the expedient of negative feedback to compensate automatically for these friction variations. In the present embodiment of this negative force feedback, the friction forces acting on each brake shoe tangent to the inner drum surface are caused to apply a counterforce opposing the hydraulic force on each brake actuating piston. This counterforce or negative feedback force is proportional to the arithmetic difference between the applied hydraulic force and (the resultant normal force multipied by the coefficient of sliding friction and by a feedback lever ratio.)

In order to obtain the desired feedback ratio, and for other advantages, the shoe pivots must be located in such positions that the sliding friction force at each shoe has a sufficiently large moment in relation to the moment of the resultant normal shoe force and the moment of the hydraulic force about the shoe pivot. The required pivot positions are determined from the force equilibrium equations of the brake system, as will be shown later herein.

In order that the moment of the shoe sliding friction force be fully utilized without any diminution, it is important to provide a ball bearing or other anti-friction type of bearing at the brake shoe end between the brake shoe and the exposed end of the hydraulic piston. Without such a bearing, the comparatively large static friction force at that point would produce a moment about the shoe pivot opposing the moment of the negative feedback force, thus partially nullifying its effectiveness.

BRIEF DESCRIPTION OF THE DRAWINGS

For a better understanding of this invention both as to its organization and as to its method of operation, together with additional objects and advantages thereof, reference is made to the following description, taken in connection with the accompanying drawings, in which.

Also shown, are the limiting friction angles tan $\phi_1$ and tan $\phi_2$ at the brake shoe ends and the spring loaded slots $S_1$ and $S_2$ that eliminate brake lock-up in reverse drum rotation.

DETAILED DESCRIPTION OF THE EMBODIMENTS

Figure 1:
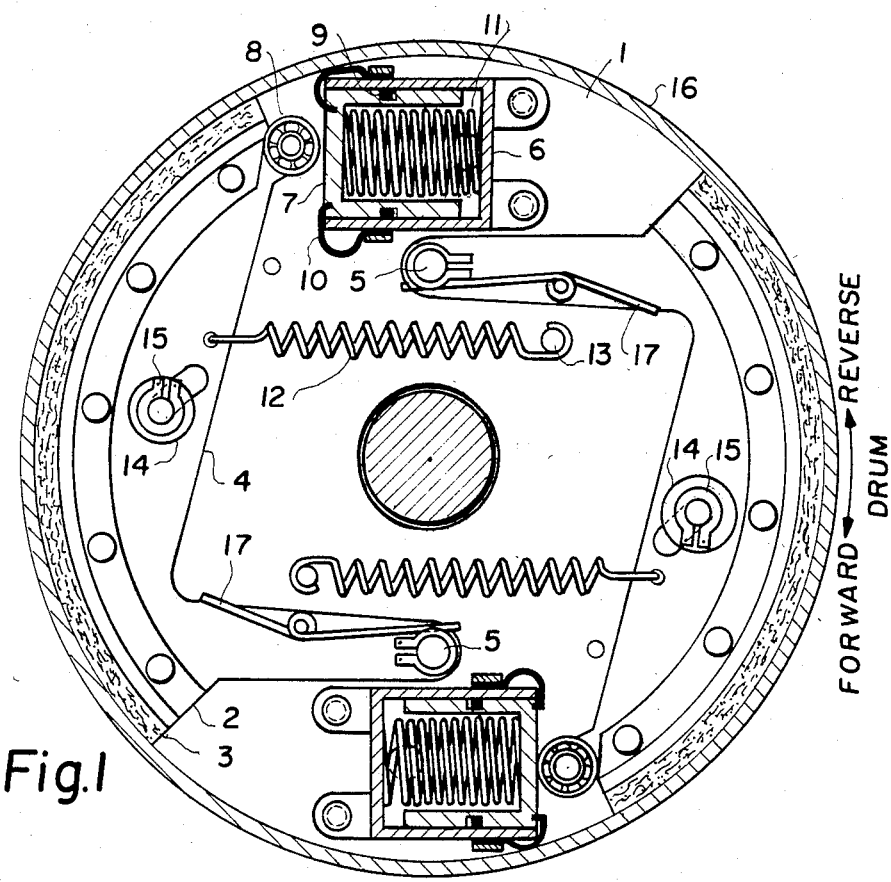
FIG. 1 is an axial sectional view of two brake shoes pivoted on shafts projecting from the stationary backplate and located diametrically opposite each other, together with separate actuating hydraulic cylinders, ball bearing couplings between pistons and shoes, shoe release springs, and anti-lock pivot slots and biasing springs for reverse rotation.

Referring to FIG. 1 showing the two hydraulic cylinder design, two identical brake shoe and cylinder subassemblies are attached to the stationary back plate 1 at diametrically opposite locations. Each consists of a brake shoe 2 with its cemented brake lining 3, an attached shoe web support 4 pivoted about a shaft 5, and an actuating hydraulic cylinder 6. A piston 7 transmits its hydraulic force to shoe 2 through an anti-friction bearing 8 mounted on the end of the shoe web 4. The hydraulic cylinder also includes the usual oil seal ring 9, a dust boot 10, and a spring 11 that keeps the piston in contact with its shoe during periods of low hydraulic pressure. A brake release spring 12 is stretched between brake shoe web 4 and a post 13 on the back plate. A washer 14 and snap ring 15 holds brake shoe web 4 in alignment with the drum 16 axis and pivot 5.

Figure 3:
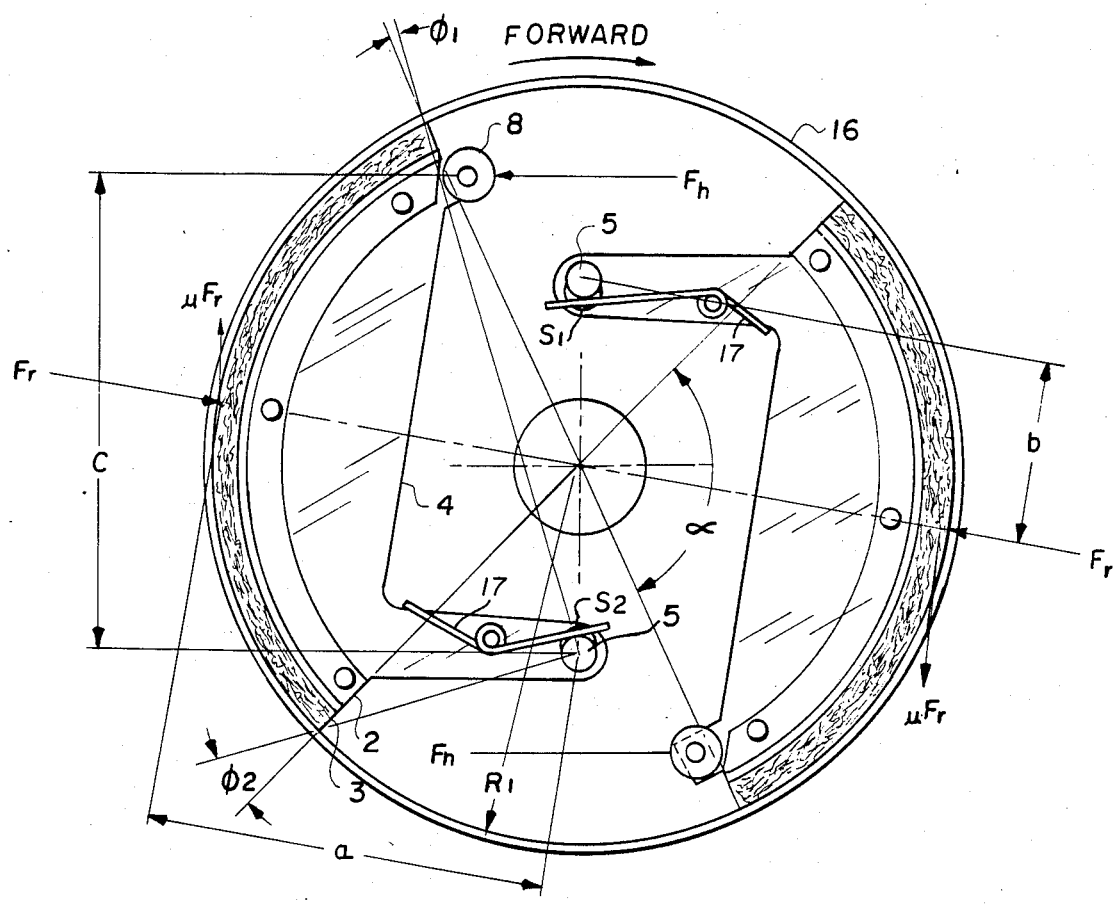
FIG. 3 is an axial sectional view of the brake components showing the distribution of the forces acting on the brake shoes, together with the respective moment arms relative to the shoe pivots. The equilibrium equation of the moments determines the magnitude of the force feedback effects on the brake system.

FIG. 3 shows the system of forces acting on the brake shoe assembly 2, 3, and 4, and consists of a hydraulic force $F_h$ along the piston axis and at a moment arm "C" with respect to pivot 5, a radial drum reaction force $F_r$ at a moment arm "b" with respect to pivot 5, and a negative feedback force $\mu F_r$ tangent to the brake shoe face and acting at a moment arm "a" with respect to the shoe pivot 5. Forces $F_r$ and $\mu F_r$ are the resultants of the distributed elementary forces acting along the arcuate face of the brake shoe.

The equilibrium of moments about pivot 5 requires that, $$F_r b = c F_h - a \mu F_r \quad (1)$$

Solving this for $F_r$ gives $$F_r = c F_h / (b + \mu a) \quad (2)$$

For a shoe radius $R_1$ from the drum center, the drum brake torque for two shoes is:

$$T = 2R_1 \mu F_r = \frac{2R_1 c u F_h}{b + \mu a}. \quad (3)$$

Equation (3) illustrates the feedback effect in reducing changes in T with changes in $\mu$. As the numerator increases due to an increase in $\mu$, the denominator also increases by the factor ua to reduce the increase in T. In the limit when "$\mu a$" is large compared to "b", $\mu$ is effectively cancelled from both numerator and denominator and the brake torque is independent of $\mu$.

In a practical embodiment of this feedback expedient, it is not possible to make "$\mu a$" large compared to "b". However, even a modest increase in the factor "$\mu a$" can result in an appreciable improvement in the uniformity of the brake torque T. This shown in the table below for b=2 in. and a=4 in. for the embodiments of FIGS. 1 and 2 and for a wide range of practical coefficients of friction $\mu$.

TABLE I

| $\mu$ | .4 | .5 | .6 | .7 |
|---|---|---|---|---|
| $\frac{T}{R_1 c F_h}$ | .222 | .250 | .272 | .292 |

A comparison of these figures shows, for example, that a 75% increase in $\mu$ from 0.4 to 0.7 gives only a 31% increase in brake torque, or a better than 2 to 1 improvement over simple proportionality.

An even more revealing set of figures occurs in the case of the typical existing drum brake with its combination of negative feedback at the trailing shoe and positive feedback at the leading shoe. The net brake torque in that case is:

$$T = \frac{cR_1 u F_h}{b + \mu a} + \frac{cR_1 u F_h}{b - \mu a} \quad (4)$$

In this case, typically, b=3¾ in., a=3¾ in. The table of T for $\mu$=0.4, 0.5, 0.6, and 0.7 is given below:

TABLE II

| $\mu$ | .4 | .5 | .6 | .7 |
|---|---|---|---|---|
| $\frac{T}{cR_1 F_h}$ | .254 | .356 | .50 | .73 |

In table II, an increase in $\mu$ from 0.4 to 0.7, or 75%, results in an 187% increase in brake torque, or 6 times greater than shown in Table I for the brake with negative feedback only. This increase is primarily due to the effect of the positive feedback of the brake friction at the leading brake shoe.

The successful application of negative feedback at both brake shoes requires also the invention of means for preventing brake lock-up for reverse drum rotation. The reverse brake torque is derived from Equation (3) by reversing the sign of "$\mu a$", thus:

$$T = \frac{2R_1 c \mu F_h}{b - \mu a} \quad (5)$$

Figure 2:
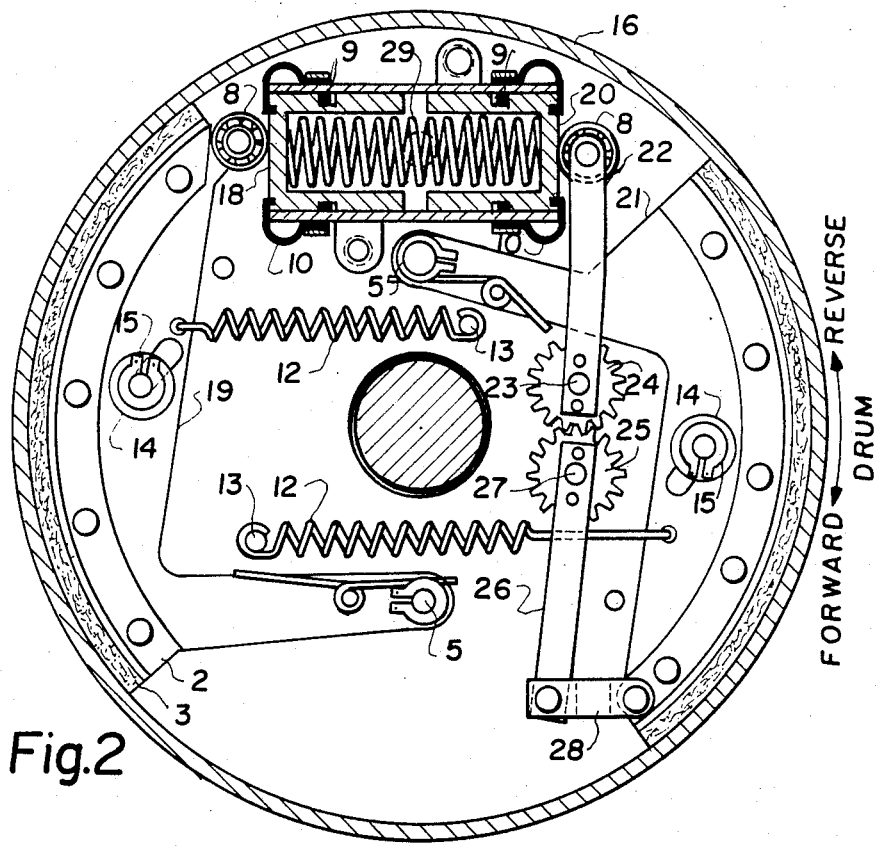
FIG. 2 is an axial sectional view of the single cylinder embodiment comprising two brake shoes pivoted on shafts projecting from the stationary backplate, a single actuating cylinder with two opposed pistons pushing in opposite directions against a brake shoe at one end and against a force transfer linkage at the other end, the force transfer linkage with pivoted levers and coupled reversing gears, shoe release springs, and anti-lock shoe pivot slots and biasing springs for reverse rotation of the drum.

Brake lock-up can occur when $\mu \geq b/a$, or $\mu \geq \frac{1}{2}$ in the ebodiments of FIGS. 1 and 2. As $\mu a \to b$, $T \to \infty$. The significance of this singular point can better be understood by referring to the geometric relations in FIG. 3 and here it is evident that when the coefficient of friction $\mu$ equals b/a, the resultant of $F_r$ and $\mu F_r$ or $F_r \sqrt{1+\mu^2}$ goes through the pivot axis 4 and has no moment about this axis. The trend in the resultant $F_r \sqrt{1+\mu^2}$ is best understood by noting that the function $T(B-\mu a) = f(F_h)$ is a rectangular hyperbola with asymptotes at the T and b$-\mu a$ axes. The steep rise in T for even small values of $F_h$ as b$-\mu a$ approaches zero is an indication of the great mechanical advantage of $F_h$ about pivot 5 when the moments of $F_r$ and $\mu F_r$ are nearly in balance, ie when the resultant $F_r \sqrt{1+\mu^2}$ nearly intersects the pivot axis 5.

The preventive for these excessive brake torques in reverse vehicle motion can be developed with the aid of the geometric relation shown in FIG. 3. There it is seen that any tendency to brake lock-up will first appear at the leading end or toe of the brake shoe, where the friction angle tan $\phi_1$ is small and the brake shoe can easily stub its toe for even comparatively small values of $\mu$. $\phi_1$ is the angle between the elementary radial force vector at the toe and the resultant elementary force vector whose components are radial force plus tangential friction force. The limiting tan $\phi_1 = \mu$ establishes the value of $\mu$ at which the resultant force vector goes through shoe pivot 5. At that point, any tendency for the resultant force to increase against the immovable pivot 5 due to the great mechanical advantage of $F_h$ can be relieved by providing slotted holes $S_1$ and $S_2$ for the brake shoes at pivot 5 and biasing each brake shoe with a spring 17 that determines the force at which the shoe will rotate about the shoe heel where the friction angle tan $\phi_2$ is great enough to prevent lock-up. Actually, there will be practically no shoe displacement at the slot but only a reduction in contact pressure between the shoe toe and the drum to prevent any lock-up tendencies at the brake for reverse rotation. The anti-lock spring 17 thus acts as a relief spring for limiting shoe forces relative to point 5 and thereby limiting the brake torque developed between the brake shoe and the drum.

In the single cylinder embodiment of FIG. 2, one piston 18 pushes against brake shoe 19 while the force of the other piston 20 is transmitted to the other shoe 21 by means of a force transfer linkage consisting of a lever 22 pivoted on axis 23, an attached gear 24 engaging a gear 25 on another lever 26 pivoted on axis 27 and connected to the toe end of shoe 21 by means of a link 28. This embodiment also includes the brake release springs 12, the anti-lock springs 17, and a spring 29 holding the pistons separated and in contact with their driven members at periods of low hydraulic pressure. Anti-friction bearings 8 are provided at the piston contact points. Other anti-friction bearings are also used on the lever axes 23, 27 because of the comparatively large radial forces at these bearings. The use of the reversing gears, 24,25 permits the large angular displacements of levers 22, 26 which are required as the brake lining wears down. The usual complement of oil seals 9 and dust boots 10 is also provided.

The feedback and brake torques developed in the embodiment of FIG. 2 are equal to those in the two hydraulic cylinder embodiment of FIG. 1. The force equilibrium parameters of FIG. 3 are also applicable to the FIG. 2 embodiment.

The unconventional location of the brake shoe pivots 5 in order to obtain the required negative force feedback also gives an important advantage over existing brakes in that the wear of the brake linings over their useful life is substantially uniform and does not require the use of starwheels and turnbuckles to displace the brake shoe pivots to equalize the lining wear as in existing brake systems. In the embodiments of FIGS. 1 and 2, where the shoe radius is equal to the drum radius minus the uniform lining thickness, 86% of the original lining will be utilized by the time the center of the shoe arc is in metal-to-metal contact with the drum. This result can be obtained simply by calculating the area of the crescent-shaped lining profile when the brake shoe circle is displaced relative to the drum circle. The result is $$\frac{Ac}{At} = \frac{2}{\pi} \times \frac{180}{\alpha} \sin \frac{\alpha}{2}, \tag{6}$$

where
Ac = area of lining crescent profile.
At = total axial area of original lining
α = included angle between the brake shoe ends, degrees.
In this case, for α = 109° in FIGS. 1, 2 and 3, $$\frac{Ac}{At} = \frac{2}{\pi} \times .814 \times \frac{180}{109} = .86$$

This is also equal to the volume ratio of utilized lining as a fraction of the original lining volume.

Alternatively, when the shoe radius is made equal to the drum radius, the lining thickness will vary along the shoe arc, and the crescent-shaped lining will be 100% utilized when the bare shoe metal contacts the drum metal along the entire shoe arc.

To summarize the whole conception, in order to realize brake torque uniformity over a range of varying coefficients of friction, the brake shoes are pivoted at diametrically opposite axes on the brake backplate to provide adequate negative feedback and to eliminate all positive feedback in forward rotation. This preferred axis location then also results in substantially uniform wear of the brake lining without starwheel and turnbuckle compensation. The latter is an approximation of the required compensation, since it is based on the statistical correlation between the number of brake applications and the resulting brake wear. Each brake application advances the starwheel one tooth, and this small turnbuckle rotation is further reduced by the turnbuckle screw to give a very minute adjustment of the shoe pivots. However, this statistical correlation does not take into account the driving habits and styles of individual drivers and can result in over-compensation or under-compensation, resulting in non-uniform wear patterns. The brake shoe geometry disclosed here gives inherently substantially uniform brake utilization and wear without any compensating adjustments.

Thus it will be seen that I have provided an efficient drum brake with two internal expanding brake shoes pivoted at substantially diametrically opposite axes and incorporating the negative feedback of the brake shoe sliding friction forces to oppose the applied hydraulic brake actuating forces for the purpose of reducing variations in brake torque due to random or uncontrolled variations in the coefficient of friction between the brake shoes and brake drum.

While I have illustrated and described several embodiments of my invention, it will be understood that these are by way of illustration only and that various changes and modifications may be contemplated in my invention and within the scope of the following claims.

I claim:

1. A friction brake comprising a rotatable drum, two brake shoes, having linings, each of less than 360° arc and pivoted on pivots on a stationary backplate substantially diametrically opposite each other, the pivots located so as to produce negative feedback moments about the pivots of the sliding friction forces between shoes and drum at both brake shoes in forward rotation of the drum, means for limiting positive feedback moments about the pivots for reverse drum rotation, and a single hydraulic cylinder for applying actuating hydraulic forces on substantially diametrically opposite brake shoe ends including a force transfer linkage for applying the hydraulic force of one piston to the remote shoe end of the corresponding brake shoe, said force transfer linkage comprising levers with engaging gears for reversing the direction of lever rotation, an anti-friction bearing at the said one piston end, and a connecting link between the force transfer levers and the shoe at the toe of said remote shoe end.

* * * * *